(12) United States Patent
Alaze

(10) Patent No.: US 8,833,731 B2
(45) Date of Patent: Sep. 16, 2014

(54) SOLENOID VALVE

(75) Inventor: Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 13/536,886

(22) Filed: Jun. 28, 2012

(65) Prior Publication Data

US 2013/0001451 A1  Jan. 3, 2013

(30) Foreign Application Priority Data

Jun. 29, 2011  (DE) .......................... 10 2011 078 325

(51) Int. Cl.
*F16K 31/02*  (2006.01)
(52) U.S. Cl.
USPC ............ 251/129.14; 251/129.02; 251/129.07; 335/279
(58) Field of Classification Search
USPC ............ 251/129.02, 129.07, 129.14, 129.15; 303/119.2; 335/235, 240, 257, 264, 335/279
See application file for complete search history.

(56) References Cited

U.S. PATENT DOCUMENTS

| 3,471,119 | A | * | 10/1969 | Risk ................................ 251/84 |
| 3,829,060 | A | * | 8/1974 | von Lewis ............... 251/129.02 |
| 4,597,558 | A | * | 7/1986 | Hafner et al. ............. 239/585.1 |
| 5,393,132 | A | * | 2/1995 | Yogo et al. ................. 303/116.1 |
| 5,704,587 | A | * | 1/1998 | Kuromitsu et al. ....... 251/129.15 |
| 2009/0121541 | A1 | * | 5/2009 | Lee et al. ................... 303/119.2 |
| 2009/0278067 | A1 | * | 11/2009 | Voss ......................... 251/129.15 |
| 2012/0326065 | A1 | * | 12/2012 | Ferguson et al. ........ 251/129.15 |

FOREIGN PATENT DOCUMENTS

| DE | 101 04 241 A1 | 8/2002 |
| DE | 10 2006 019 464 A1 | 9/2007 |
| DE | 10 2006 055 831 A1 | 5/2008 |
| EP | 2 246 601 A2 | 11/2010 |

* cited by examiner

*Primary Examiner* — John K Fristoe, Jr.
*Assistant Examiner* — Matthew W Jellett
(74) *Attorney, Agent, or Firm* — Maginot, Moore & Beck

(57) ABSTRACT

A solenoid valve includes at least one armature that is axially displaceable in a valve housing and a valve element that is operatively connected to the armature. The valve element can be arranged by means of the armature to open up or close off at least one valve seat of the solenoid valve. A non-return valve is provided between a first fluid connection and a second fluid connection of the solenoid valve. In so doing, the non-return valve is arranged at least in regions in the armature.

14 Claims, 1 Drawing Sheet

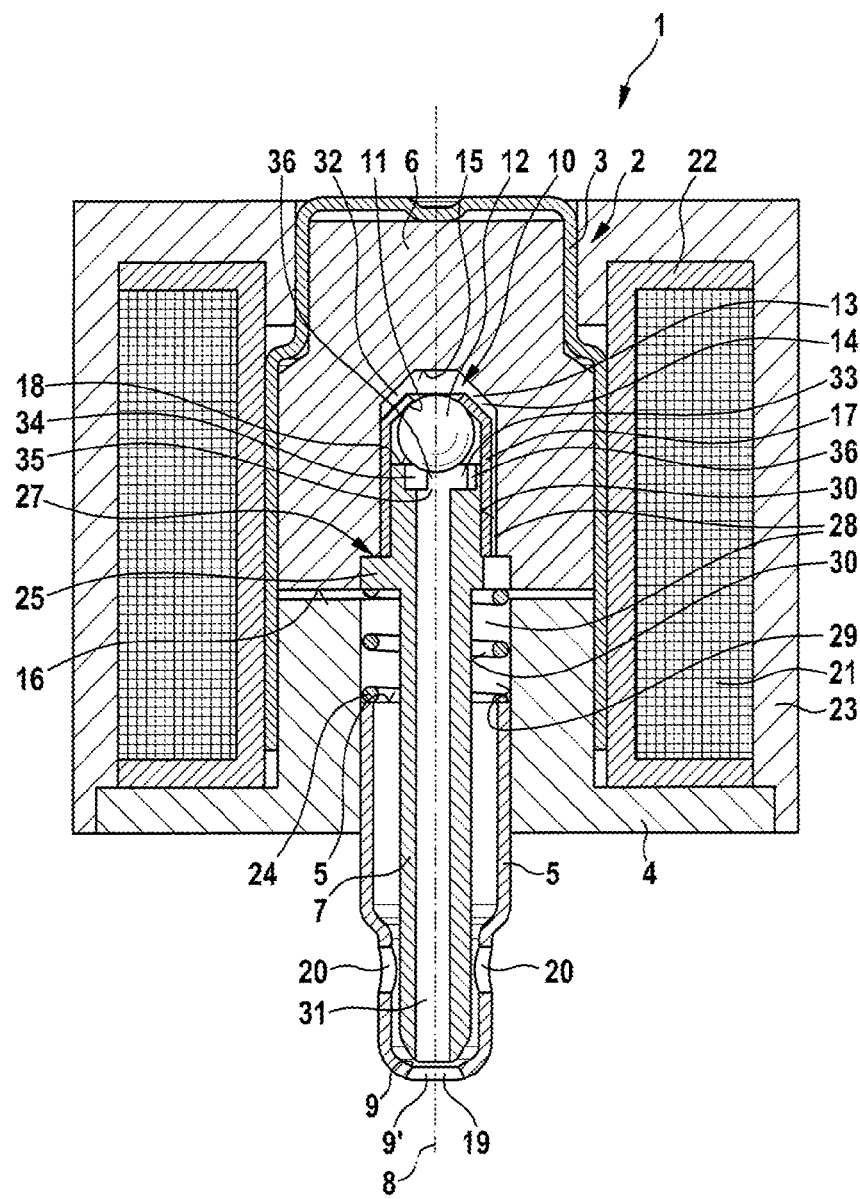

SOLENOID VALVE

This application claims priority under 35 U.S.C. §119 to patent application no. DE 10 2011 078 325.3, filed on Jun. 29, 2011 in Germany, the disclosure of which is incorporated herein by reference in its entirety.

The disclosure relates to a solenoid valve having at least one armature that is axially displaceable in a valve housing and having a valve element that is operatively connected to the armature, wherein the valve element can be arranged by means of the armature to open up or close off at least one valve seat of the solenoid valve, and having a non-return valve that is arranged between a first fluid connection and a second fluid connection of the solenoid valve.

BACKGROUND

Solenoid valves of the type mentioned in the introduction are known from the prior art. The armature of a solenoid valve of this type can be influenced by a magnetic force, for example, by means of at least one coil in such a manner that the said armature is axially displaced and in so doing the valve element is arranged to open up or close off the valve seat. The armature and/or the valve element can in addition be operatively connected to a resilient element, which produces a resilient force that urges the armature and/or the valve element in the direction of the respective idle position and/or its starting position. The idle position can be an open position in which the valve element at least partially opens up the valve seat, or a closed position in which the valve element closes off the valve seat. A de-energized open solenoid valve is provided in the first case and in the latter case a de-energized closed solenoid valve is provided. The solenoid valve can be embodied, for example, as a high pressure switchover valve. Preferably it is used in a driver-assisting device, which is, for example, an ESP, ASR or an ABS system.

The solenoid valve comprises a first fluid connection and a second fluid connection for a fluid. If the solenoid valve is open, i.e. the armature is arranged to open up the valve seat, then the fluid can flow through the solenoid valve from the first fluid connection as far as the second fluid connection. If, on the other hand, the solenoid valve is closed, then the valve element is arranged to close off the valve seat, consequently closing the flow connection between the first fluid connection and the second fluid connection inside the solenoid valve. The first fluid connection of the solenoid valve is allocated, for example, to a wheel brake cylinder and the second fluid connection is allocated to a master brake cylinder of a braking system. As the brakes are applied, pressure builds up in the master brake cylinder and consequently also in the wheel brake cylinder. When the solenoid valve is open, fluid can flow out of the master brake cylinder in the direction of the wheel brake cylinder, on the other hand, when the solenoid valve is closed, the flow connection is closed.

In addition, the non-return valve is arranged so as to influence the flow between the first fluid connection and the second fluid connection of the solenoid valve. The non-return valve is provided for the purpose of allowing a through-flow between the first and the second fluid connection only in one direction, namely only from the second fluid connection to the first fluid connection. When the solenoid valve is open, the non-return valve is substantially non-functional. If, on the other hand, the solenoid valve is closed, then by virtue of the valve seat no fluid can flow between the first and the second fluid connection, however, by means of the non-return valve a flow connection is opened between the first and the second fluid connection. If, when the solenoid valve is closed, the pressure of the fluid that prevails at the second fluid connection exceeds the pressure that prevails at the first fluid connection, then the non-return valve opens so that the fluid can flow through the solenoid valve from the second fluid connection to the first fluid connection. If, on the other hand, the pressure on the side of the first fluid connection is greater or equal to the pressure on the side of the second fluid connection, then the non-return valve is closed.

Thus, the non-return valve generally only opens if both the solenoid valve is closed (because only in this case is there a difference between the pressure at the first fluid connection and the pressure at the second fluid connection) and the pressure at the second fluid connection is higher than the pressure at the first fluid connection. In this manner, it is possible for the prevailing pressure in the wheel brake cylinder to reduce when the solenoid valve is closed if the pressure prevailing in the master brake cylinder is lower than the pressure in the wheel brake cylinder. The solenoid valve is preferably a de-energized open solenoid valve that is used as an inlet valve of the driver-assisting device. The non-return valve is generally arranged in a separate component of the solenoid valve, which increases the overall size of the solenoid valve.

SUMMARY

In contrast, the solenoid valve having the features disclosed in claim 1 comprises the advantage that the overall size, in particular in the axial direction, can be considerably reduced. This is achieved in accordance with features of the disclosure in that the non-return valve is arranged at least in regions in the armature. Consequently, the separate component that is generally provided to accommodate the non-return valve is not required. For this purpose, flow channels are provided that ensure the non-return valve is connected in such a manner as to influence the flow to the first fluid connection and to the second fluid connection. In addition or alternatively an embodiment of the solenoid valve is also feasible in which the non-return valve is provided at least in regions in the valve element.

An embodiment of the disclosure provides that the valve element engages in regions in a cutout of the armature and in so doing is at such a spaced disposition with respect to a base of the cutout that a flow chamber is provided in the cutout between the valve element and the base. The flow chamber is embodied accordingly in the armature. It is defined on one of its sides by the base of the flow chamber and on its other side by the valve element and/or by its end face facing the armature. Preferably the valve element is pressed into the cutout, so that it is held therein in a non-positive manner. Consequently, the flow chamber that is used as a valve chamber for the non-return valve can be embodied in a simple and cost-effective manner.

An embodiment of the disclosure provides that the non-return valve comprises a non-return valve seat that is arranged in the flow chamber and a non-return valve element that cooperates with the non-return valve to open or close the flow connection between the first fluid connection and the second fluid connection. The flow chamber comprises consequently all essential elements of the non-return valve, namely the non-return valve seat and the non-return valve element. The non-return valve element can in principle be embodied as desired, it does, however, comprise a shape that is suitable for cooperating with the non-return valve seat to close the flow connection. Preferably the non-return valve element is spherical in shape, whilst the non-return valve seat comprises a circular cross-section. The flow connection is opened and/or closed in dependence upon the through-flow direction of the non-return valve and/or the pressures that are prevailing at the first fluid connection and the second fluid connection. If the pressure prevailing at the first fluid connection is higher than that at the second fluid connection, then the non-return valve element is urged into the non-return valve seat. Consequently, as the pressure difference increases so does the sealing effect of the non-return valve, so that it is ensured that the fluid cannot flow from the first fluid connection to the second fluid connection when the solenoid valve is closed. If, on the other hand, the pressure at the second fluid connection is greater than that at the first fluid connection then the non-return valve element is urged out of the non-return valve seat, which it then opens up for throughflow. In this case, the fluid can flow unhindered through the solenoid valve from the second fluid connection to the first fluid connection.

An embodiment of the disclosure provides that the non-return valve seat is provided on a non-return valve body that is provided in the radial direction in regions between the armature and the valve element, in particular is held clamped between the armature and the valve element. The non-return valve seat is provided at least in regions in the flow chamber. In order to hold the said non-return valve seat in place in the flow chamber, the said non-return valve body engages in a gap provided between the armature and the valve element, i.e. it lies in the radial direction between the armature and the valve element. The gap can be provided as an annular gap. Consequently, the non-return valve body is fixed at least in the radial direction with respect to the armature and/or the valve element. If, in addition, it is intended to hold the non-return valve body in the axial direction, then it is advantageous if the non-return valve body is held clamped between the armature and the valve element, i.e. it engages in the gap in such a manner that a non-positive connection is provided on the one hand between the armature and the non-return valve body and on the other hand between the non-return valve body and the valve element. This renders it possible to assemble the solenoid valve in a simple manner, because only the non-return valve body needs to be placed on the valve element and the latter subsequently pressed into the cutout of the armature.

An embodiment of the disclosure provides that a first flow channel is provided between the valve housing and/or the armature and the valve element, by means of which the second fluid connection is connected to an inlet side of the non-return valve. The inlet side of the non-return valve is consequently allocated to the second fluid connection, whereas an outlet side is allocated to the first fluid connection and is fluid—connected therewith. In order to allow one function of the non-return valve, it is now necessary to provide flow channels between the inlet side of the non-return valve and the second fluid connection and also between the outlet side and the first fluid connection. The first flow channel by way of which the fluid connection is provided between the second fluid connection and the inlet side is embodied jointly by the valve housing and/or the armature and the valve element. Consequently, an inner wall of the valve housing and/or of the armature defines one side and an outer wall of the valve element defines the other side of the flow channel. As a consequence, the first flow channel is generally provided as an annular gap between the valve housing and/or armature on one side and the valve element on the other side.

An embodiment of the disclosure provides that a second flow channel is provided in the valve element, by means of which the first fluid connection is fluid-connected to an outlet side of the non-return valve even if the valve element is in the closed position. In order to allow the function of the non-return valve, it must always be fluid-connected both to the first fluid connection and also to the second fluid connection, in particular if the solenoid valve is closed, i.e. the valve element is located in its closed position. The second flow channel that is embodied in the valve element is provided for this purpose. For example, the second flow channel is a through-going bore that engages fully through the valve element in the longitudinal direction, so that the second flow channel issues both into a first end face of the valve element and also into a second end face lying opposite to the first end face, or rather engages through said faces.

An embodiment of the disclosure provides that the non-return valve element is at a spaced disposition from an armature-side orifice of the second flow channel by means of a distance piece. Generally, the non-return valve element is arranged between the armature-side orifice of the second flow channel and the non-return valve seat provided in the non-return valve body. The distance piece is to be provided in order to prevent the non-return valve element from being able to cooperate both with the non-return valve seat and also the orifice of the second flow channel in order to close the fluid connection between the first fluid connection and the second fluid connection. This ensures that the non-return valve element cannot cooperate with the orifice of the second flow channel in such a manner that the non-return valve then closes even if the non-return valve element does not cooperate with the non-return valve seat to close the flow connection.

An embodiment of the disclosure provides that the valve housing is provided with a valve body that comprises on its side facing away from the armature a through-going orifice that also forms the valve seat. The valve body represents a part of the valve housing. The valve housing is, for example, fastened to a base body of the solenoid valve, wherein the base body for its part is connected to a capsule of the solenoid valve. The valve housing comprises in this respect the capsule, the base body and the valve body. The valve seat is now to be provided in the valve body or rather embodied thereon. For this purpose, a through-going orifice is provided in the valve body, wherein the side of the through-going orifice facing the armature forms the valve seat. Preferably the second flow channel that is provided in the valve element and the through-going orifice of the valve body are arranged coaxially with respect to each other. It is particularly advantageous if the valve body is pressed into the base body and if the capsule is pressed onto the base body or is fastened thereto in a different manner.

An embodiment of the disclosure provides that a restoring element of the solenoid valve is supported with one of its ends on the valve element and/or the armature and with its other end on the valve body. The restoring element is used to urge the armature into its starting position, in the case of a de-energized open solenoid valve the solenoid element is therefore arranged to open up the valve seat. In the case of a de-energized closed solenoid valve the restoring element urges the valve element on the other hand in the direction towards the valve seat, i.e. into its closed position. The restoring element is embodied, for example, as a helical spring that encompasses the valve element in the peripheral direction. It is now provided that the restoring element is supported both on the valve body and also on the valve element and/or the armature in order to create the resilient force for restoring the valve element. Thus, it is not necessary to provide an additional supporting body for the restoring element.

An embodiment of the disclosure provides that both the first fluid connection, in particular in the axial direction, and also the second fluid connection, in particular in the radial direction, are embodied on the valve body. The valve body consequently integrates both the first and also the second fluid connection. The former is provided on the valve body preferably in the axial direction and the latter preferably in the radial direction. When specifying the direction, a main flow direction is understood to mean when the solenoid valve is open. Thus, the fluid flows through the first fluid connection in an axial direction and through the second fluid connection in the radial direction. Naturally, a plurality of first fluid connections and/or a plurality of second fluid connections can be provided on the valve body.

BRIEF DESCRIPTION OF THE DRAWING

Features of the disclosure are explained in further detail hereinunder with reference to the exemplary embodiments illustrated in the drawing without thereby limiting the invention. In so doing, the single FIG. 1 shows a longitudinal cross-sectional view of a solenoid valve having an integrated non-return valve.

DETAILED DESCRIPTION

The FIGURE shows a longitudinal cross-sectional view through a solenoid valve 1. The solenoid valve 1 comprises a housing 2 that in the embodiment illustrated here comprises a capsule 3, a base body 4 and a valve body 5. However, the housing 2 can also be embodied in any desirable manner, for example, only from the capsule 3 and the valve body 5. An armature 6 that is operatively connected to a valve element 7 is provided in the housing 2, in particular in the capsule 3. The armature 6 and the valve element 7 are displaceable in the housing 2 in the axial direction of a longitudinal axis 8. The valve element 7 can consequently be arranged to open up or close off a valve seat 9. In addition, the solenoid valve 1 comprises a non-return valve 10 that is integrated at least in regions in the armature 6 and/or the valve element 7. The non-return valve 10 comprises a non-return valve seat 11 and a non-return valve element 12 that is embodied in the embodiment illustrated here as a sphere.

The non-return valve 10 is arranged in a flow chamber 13 that is embodied by the armature 6 and the valve element 7. For this purpose, the valve element 7 engages in regions in a cutout 14 of the armature 6. In so doing, it is at such a spaced disposition with respect to a base 15 of the cutout that the flow chamber 13 is provided at the end of the cutout 14. The cutout 14 is provided in this respect as a blind orifice in the armature 6 and passes through only its end face 16 that is facing the valve seat 9.

The non-return valve seat 11 is embodied by a non-return valve body 17. The said non-return valve body is present in regions in the form of a hollow cylinder, wherein its dimensions taper in the direction towards the base 15. The non-return valve body 17 encompasses with its lower, hollow cylinder-shaped region the valve element 7 and is thus arranged in the radial direction in regions between the armature 6 and the valve element 7. Preferably the non-return valve body 17 is held clamped between the armature 6 and the valve body 7, so that no additional fastening element is required to hold the non-return valve body 17. The non-return valve seat 11 is at a sufficiently spaced disposition from an end face 18 of the valve element 7 that it is possible for the non-return valve element 12 to displace in the axial direction out of the non-return valve seat 11, i.e. in the direction towards the valve element 7.

The solenoid valve 1 comprises a first fluid connection 19 and a plurality of, in particular four, second fluid connections 20, of which only two are evident here. If the solenoid valve 1 is open, then the valve body 5 is arranged at a spaced disposition from the valve seat 9, so that a fluid can flow between the first fluid connection 19 and the second fluid connection 20 and/or in the reverse direction. If, on the other hand, the valve element 7 is located in its closed position, i.e. it is cooperating with the valve seat to close the flow connection between the first fluid connection 19 and the second fluid connection 20, then fluid cannot flow between the two said connections. The valve element 7 and/or the armature 6 is displaced by means of at least one coil 21 that is held in a coil retaining device 22 on the housing 2 of the solenoid valve 1. The coil 21 and the housing 2 in the embodiment illustrated here are encompassed by a housing periphery 23 at least in the peripheral direction over the entire height extension of the housing 2.

The solenoid valve 1 comprises in addition a restoring element 24 that counteracts a displacement of the valve element 7 and/or the armature 6 by means of the coil 21. If the coil 21 is no longer influenced in this respect by current, then the restoring element 24 urges the armature 6 and also the valve element 7 into their starting position. This starting position can for example be the closed position or the open position of the solenoid valve 1. The restoring element 24 in this case is embodied as a helical spring that encompasses the valve element 7 in the peripheral direction. The said restoring element is supported with one of its ends on a protrusion 25 of the valve element 7 and with its other end on an end face 26 of the valve body 5. The protrusion 25 of the valve element 7 is embodied by a radial protrusion that simultaneously forms an end stop 27 for introducing the valve element 7 into the cutout 14 of the armature 6.

In order for the non-return valve 10 to function properly, it is necessary that it is fluid-connected both to the first fluid connection 19 and also to the second fluid connection 20. For this purpose, a first flow channel 28 is provided between the valve housing 2 and/or the armature 6 and the valve element 7. The said flow channel is defined in this respect by an inner wall 29 of the valve housing 2 and/or of the flow chamber 13 and by an outer wall 30 of the valve element 7. In order to embody the first flow channel 28, it can also be provided that the non-return valve body 17 comprises through-flow channels in the axial direction, which channels are provided, for example, as edge-open cutouts in its peripheral surface (not illustrated here).

A second flow channel 31 by way of which the non-return valve 10 is fluid-connected to the first fluid connection 19 is provided in the valve element 7. The second flow channel 31 is a through-going bore that fully penetrates the valve element 7 in the longitudinal direction. Whereas the first flow channel 28 forms a fluid connection of the second fluid connection 20 to an inlet side 32 of the non-return valve 10, the second flow channel 31 represents a fluid connection of the first fluid connection 19 to an outlet side 33. The end face 18 of the valve element 7 is formed by a distance piece 34 that prevents the non-return valve element 12 from closing an armature-side orifice 35 of the second flow channel 31. For this purpose, the distance piece 34 forms substantially an extension of the second flow channel 31 having an enlarged diameter and comprises an edge-open cutout 36. By virtue of the edge-open cutouts 36 that are distributed uniformly over the periphery of the valve element 7 and/or its distance piece 34, the fluid can also then still flow if the non-return valve element 12 lies on the end face 18 of the valve element 7.

The valve body 5 comprises on its side facing away from the armature 6 a through-going orifice 9' that also forms the valve seat 9 and that simultaneously forms the first fluid connection 19. The first fluid connection 19 is provided in the axial direction in the exemplary embodiment illustrated here and the second fluid connections 20 are provided in the radial direction. The solenoid valve 1 is in particular embodied in such a manner that the valve element 7 can be inserted directly into a solenoid valve receiving device (not illustrated here). In this respect, the disclosure relates also to a solenoid valve arrangement having the solenoid valve 1 in accordance with the preceding disclosures and having a solenoid valve receiving device in which the solenoid valve is held. In so doing, a non-positive connection to the solenoid valve receiving device is to be provided on the valve element 7 of the solenoid valve 1. The non-positive connection is produced in particular by means of pressing the valve element 7 into the solenoid valve receiving device.

What is claimed is:

1. A solenoid valve having at least one armature that is axially displaceable in an axial direction in a valve housing, the axial direction defined by a longitudinal axis of the housing, and having a valve element that is operatively connected to the armature, wherein the valve element is configured to be arranged by the armature to open up or close off at least one valve seat of the solenoid valve, and having a non-return valve that is provided between a first fluid connection and a second fluid connection of the solenoid valve, wherein the non-return valve is arranged at least in regions in the armature, wherein the valve element is configured to engage in regions defined within a cutout of the armature and in so doing is at such a spaced disposition with respect to a base of the cutout that a flow chamber is provided in the cutout between the valve element and the base.

2. The solenoid valve according to claim 1, wherein the non-return valve comprises a non-return valve seat that is arranged in the flow chamber and a non-return valve element that cooperates with the non-return valve seat to open or close the flow connection between the first fluid connection and the second fluid connection.

3. The solenoid valve according to claim 1, wherein a non-return valve seat is provided on a non-return valve body of the non-return valve that is provided in a radial direction defined with respect to the longitudinal axis in regions between the armature and the valve element.

4. The solenoid valve according to claim 1, wherein a first flow channel is provided between one of the valve housing and the armature and the valve element, by way of which flow channel the second fluid connection is in fluid connection with an inlet side of the non-return valve.

5. The solenoid valve according to claim 4, wherein a second flow channel is provided in the valve element, by way of which flow channel the first fluid connection is fluid-connected to an outlet side of the non-return valve even when the valve element is in the closed position.

6. The solenoid valve according to claim 1, wherein the non-return valve element is at a spaced disposition with respect to an armature-side orifice of the second flow channel by way of a distance piece.

7. The solenoid valve according to claim 1, wherein the valve housing is provided with a valve body that comprises on its side facing away from the armature a through-going orifice that also forms the valve seat.

8. The solenoid valve according to claim 7, further comprising a restoring element, wherein the restoring element is supported with one of its ends on one of the valve element and the armature and with its other end on the valve body.

9. The solenoid valve according to claim 8, wherein both the first fluid connection, in the axial direction, and also the second fluid connection, in a radial direction defined with respect to the longitudinal axis, are configured on the valve body.

10. The solenoid valve according to claim 2, wherein the non-return valve seat is provided on a non-return valve body of the non-return valve that is provided in a radial direction defined with respect to the longitudinal axis in regions between the armature and the valve element, wherein a dimension of the non-return valve body tapers in a direction toward the base.

11. The solenoid valve according to claim 10, wherein the base includes a taper configured to taper from the non-return valve body.

12. The solenoid valve according to claim 2, wherein the base includes a taper configured to taper from the non-return valve seat.

13. The solenoid valve according to claim 12, wherein the non-return valve seat is provided on a non-return valve body of the non-return valve that is provided in a radial direction defined with respect to the longitudinal axis in regions between the armature and the valve element, wherein a dimension of the non-return valve body tapers in a direction toward the base.

14. The solenoid valve according to claim 2, wherein the non-return valve seat is provided on a non-return valve body of the non-return valve that is provided in a radial direction defined with respect to the longitudinal axis in regions between the armature and the valve element, wherein a flow channel is defined in a space between the non-return valve body and the armature.

* * * * *